July 8, 1924.

D. B. SMITH 1,500,341

TRANSMISSION RELINING BAND

Filed Sept. 24, 1923        2 Sheets-Sheet 1

INVENTOR.
DOUGLAS B. SMITH.
BY Dewey, Strong,
Townsend & Loftus
ATTORNEYS.

July 8, 1924.
D. B. SMITH
1,500,341
TRANSMISSION RELINING BAND
Filed Sept. 24, 1923    2 Sheets-Sheet 2
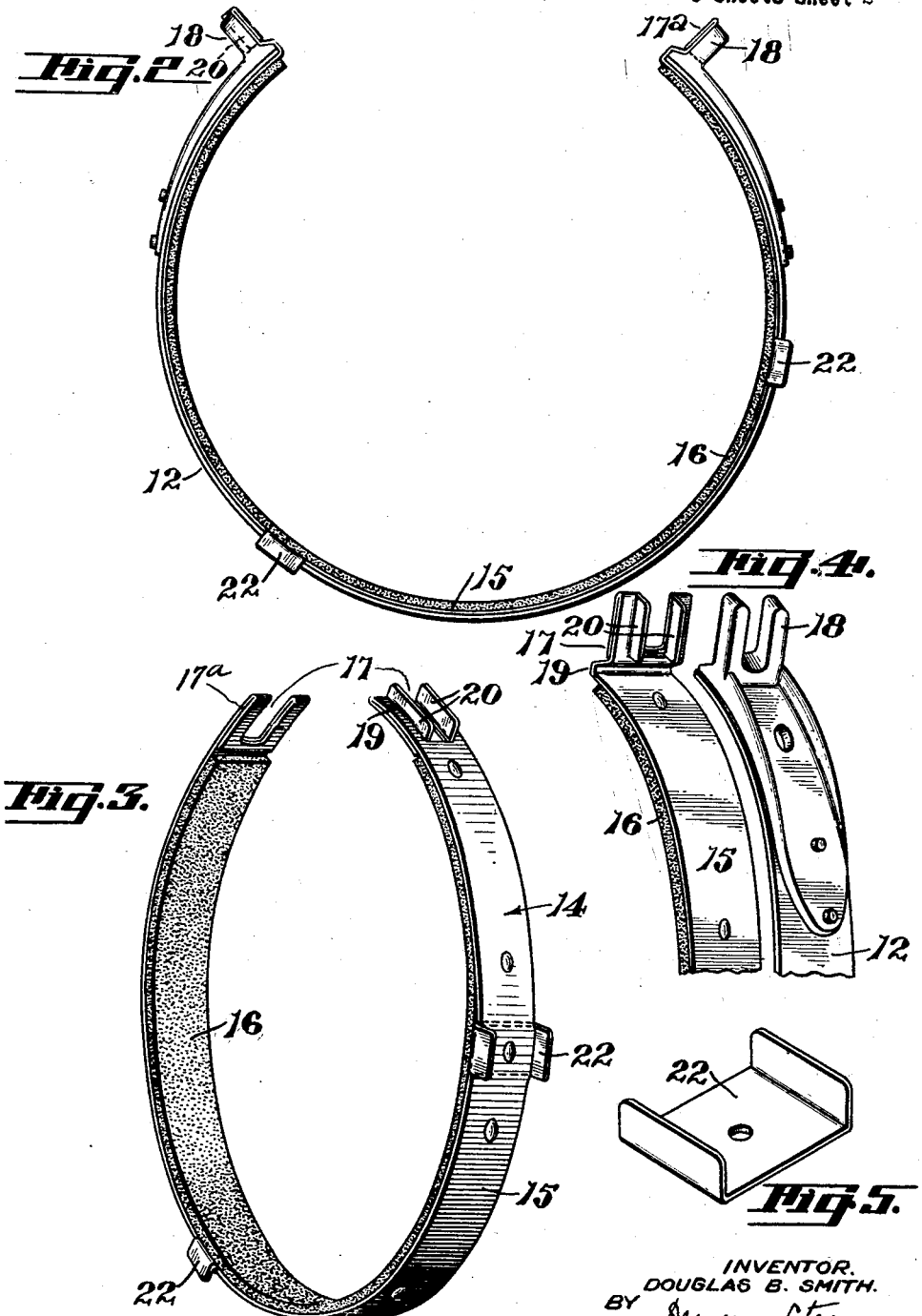
INVENTOR.
DOUGLAS B. SMITH.
BY Dewey, Strong,
Townsend & Loftus
ATTORNEYS.

Patented July 8, 1924.

1,500,341

UNITED STATES PATENT OFFICE.

DOUGLAS B. SMITH, OF SAN FRANCISCO, CALIFORNIA.

TRANSMISSION RELINING BAND.

Application filed September 24, 1923. Serial No. 664,363.

*To all whom it may concern:*

Be it known that I, DOUGLAS B. SMITH, a citizen of the United States, residing at the city and county of San Francisco, and State of California, have invented new and useful Improvements in Transmission Relining Bands, of which the following is a specification.

This invention relates to automobile transmissions of the planetary type and particularly pertains to liners for the transmission bands thereof.

Prior to my invention liners have been manufactured for planetary transmission bands which were capable of being properly positioned by removing the transmission cover, and the old band lining, and by inserting the end of the new liner between the band and the drum. The liner could then be forced around the periphery of the drum between it and the band and connected to the band at its ends by means of the band operating shaft. In this manner the transmission bands could be easily and quickly fitted with new liners without the necessity of completely disassembling the entire transmission.

These prior devices have not proven entirely satisfactory for the reason that with the exception of the end connections, no provision was made for maintaining the liners in correct alignment with the bands. This permitted the liners to become out of alignment and to interfere with the proper operation of the transmission. Therefore, it is the principal object of the present invention to improve the construction of liners of the type referred to whereby to provide an improved liner which may be easily and quickly inserted into place in a planetary transmission without disassembling the latter; which liner is fitted with means insuring that it will be maintained in a correct position relative to the band to which it is fitted.

One form which the present invention may assume is exemplified in the following description and illustrated in the accompanying drawings, in which:

Fig. 2 is a side elevation of a transmission band with my improved liner mounted thereon.

Fig. 3 is a perspective view of the liner.

Fig. 4 is a fragmentary view in perspective of one end of the transmission band and one end of the liner showing the aligning lugs on the latter.

Fig. 5 is a perspective view of one of the guide members employed.

Figure 1:
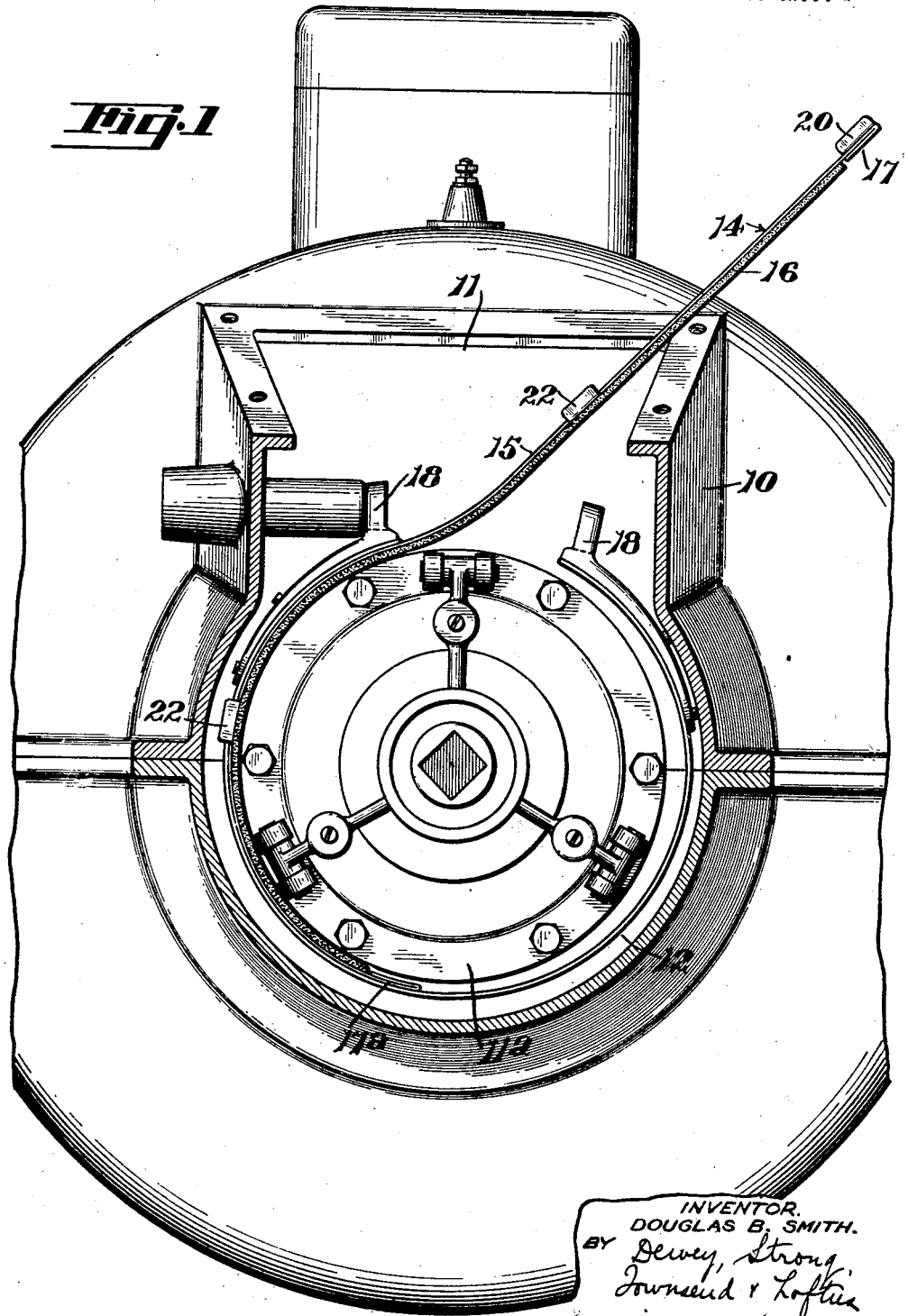
Fig. 1 is a transverse section through a planetary type transmission showing a band reliner embodying the present invention being inserted therein.

Referring more particularly to the accompanying drawings, 10 indicates the transmission case of a Ford type automobile. The top of the case 10 is formed with an opening 11 which is provided with a removable cover plate. The case 10 encloses a planetary transmission having the usual drums 11ª and operating bands 12.

The lining of these bands must be frequently replaced to insure proper operation of the transmission. For this purpose I provide a liner 14 which is clearly illustrated in Fig. 3. This liner comprises a flexible band 15, preferably of steel, and a treated fabric lining 16 which is riveted or otherwise secured to the interior surface of the band. The terminating ends of the flexible band 15 are bent over as shown in Fig. 3 and then cut away to provide slotted openings 17. These openings, when the liner is assembled on a transmission band, are adapted to align with the openings in the end lugs 18 of the transmission band.

The terminating end 19 of the flexible band is cut and bent to form aligning lugs 20. These lugs extend along the edges of the slotted opening 17 and project at right angles to the surface of the band 15. These lugs are adapted to enter the opening in the end lug of the transmission band to assist in maintaining the liner in correct position thereon.

To position the liners in place without disassembling the entire transmission, the transmission case cover is removed. The band operating shafts are then disconnected and the old liners removed from the bands. The flat end 17ª of the new liner is then inserted between the transmission band and the drum and forced around the periphery of the drum until the ends of the liner are aligned with the end lugs on the band. The ends of the liner are then bent into intimate contact with the end lugs of the transmission band. The aligning lugs 20 are thus positioned and the band operating shaft may be replaced.

To guide the liner around the periphery of the band and to hold the liner in alignment therewith, I fit the liner with a plurality of guide members 22. These members extend transversely of the liner at intervals about its periphery and are fitted between the flexible band 15 and the lining 16. The ends of members 22 are bent outwardly to engage the sides of the transmission band when the liner is positioned on the band. The members 22 maintain the liners in correct position on the bands and prevent them from becoming out of alignment and from interfering with the proper operation of the transmission.

Flexible reliners in some respects similar to my invention have been manufactured prior to this time. These liners were capable of insertion into the transmission in the same manner as the present device. However, no means was provided for securely maintaining these prior liners correctly in position on the bands and they often became out of alignment and seriously affected the operation of the transmission.

By the provision of the aligning lugs and the guide members 22, I have overcome the difficulty encountered by these prior experiments and thus have provided a liner which may be easily and quickly positioned by unskilled persons.

While I have shown the preferred form of my invention as now known to me, I wish it understood that various changes may be made in its construction without departing from the spirit of the invention as defined in the appended claims.

Having thus described my invention, what I claim and desire to secure by Letters Patent is:—

1. A liner for a planetary transmission band, said liner being capable of being inserted into place without disassembling said transmission, said liner comprising a lined flexible band having slotted ends to coincide with the slotted ends of the transmission band, aligned lugs formed at one end of said slotted ends of the flexible band, said lugs being adapted to engage the slotted opening in one of the ends of said transmission band, a plurality of guide members formed at opposite sides of said flexible band at a plurality of points around the circumference thereof, said guide members extending radially whereby they may be engaged with opposite sides of the transmission band to guide the liner when it is being positioned and to maintain the liner correctly positioned on the transmission band.

2. A liner for a planetary transmission band, said liner being capable of being inserted into place without disassembling said transmission, said liner comprising a lined flexible band having slotted ends to coincide with the slotted ends of the transmission band, aligning lugs formed at one of said slotted ends of the flexible band, said lugs being adapted to engage the slotted opening in one of the lugs of said transmission band, and a plurality of guide members fixed to the band at a plurality of points around the circumference thereof for engagement with the sides of the transmission band to guide the liner when it is being positioned and to maintain the liner correctly positioned on said transmission band, said guide members comprising flat members extending transversely of the flexible band, the ends of said flat members being bent outwardly so as to extend radially from opposite sides of the flexible band.

3. A liner for a planetary transmission band, said liner comprising a flexible metal band having a friction facing, the terminating ends of said band being adapted to be bent into intimate contact with the ends of the transmission band, said ends of the flexible band being slotted to coincide with the slotted ends of the transmission band, and lugs formed at said ends of the flexible band engageable with the ends of the transmission band whereby to prevent relative movement between the flexible band and the transmission band.

4. A liner for a planetary transmission band, said liner comprising a flexible metal band having a friction facing, the terminating ends of said liner being adapted to be bent into intimate contact with the ends of the transmission band, said ends of the flexible band being slotted to coincide with the slotted ends of the transmission band, aligned lugs formed at the sides of the slot in one of the ends of said flexible band, said lugs being adapted to engage the slotted opening in one of the ends of said transmission band, whereby to prevent relative movement between the flexible band and the transmission band.

DOUGLAS B. SMITH.